(12) United States Patent
Yoshihara et al.

(10) Patent No.: US 8,142,884 B2
(45) Date of Patent: Mar. 27, 2012

(54) RELEASE FILM AND STACKED BODY

(75) Inventors: Toshiaki Yoshihara, Tokyo (JP); Satoshi Iwata, Tokyo (JP); Tsuguki Nishihara, Tokyo (JP); Koshin Cho, Tokyo (JP)

(73) Assignee: Toppan Printing Co., Ltd. (JP)

( * ) Notice: Subject to any disclaimer, the term of this patent is extended or adjusted under 35 U.S.C. 154(b) by 0 days.

(21) Appl. No.: 12/890,163

(22) Filed: Sep. 24, 2010

(65) Prior Publication Data

US 2011/0020622 A1 Jan. 27, 2011

Related U.S. Application Data

(63) Continuation of application No. PCT/JP2009/055864, filed on Mar. 24, 2009.

(30) Foreign Application Priority Data

Mar. 26, 2008 (JP) ................................. 2008-079920

(51) Int. Cl.
*B32B 7/02* (2006.01)

(52) U.S. Cl. .......................... 428/212; 428/216; 428/447

(58) Field of Classification Search .................. 428/212, 428/216, 447
See application file for complete search history.

(56) References Cited

U.S. PATENT DOCUMENTS

| 6,682,822 | B2 * | 1/2004 | Cretekos et al. ............. 428/447 |
| 2007/0166523 | A1 * | 7/2007 | Fukaya et al. ............. 428/292.1 |

FOREIGN PATENT DOCUMENTS

| JP | 07-003215 | 1/1995 |
| JP | 09-156060 | 6/1997 |
| JP | 11-300897 | 11/1999 |
| JP | 2005-202389 | 7/2005 |
| JP | 2006-124686 | 5/2006 |
| JP | 2008-003122 | 1/2008 |

OTHER PUBLICATIONS

Eiichi et al (JP 2008-003122 machine translation), Jan. 10, 2008.*
International Search Report for International Application No. PCT/JP2009/055864, Jun. 9, 2009 (13 pages, with English translation).

* cited by examiner

*Primary Examiner* — David Sample
*Assistant Examiner* — Lawrence Ferguson
(74) *Attorney, Agent, or Firm* — Squire Sanders (US) LLP

(57) ABSTRACT

The present invention provides a release film which has a release layer on a film substrate, which has excellent long-term preservation stability and yet maintains a stripping performance of the release film, which serves to make inspection for foreign materials easy, and which provides excellent design effect when a print layer is formed. The release film has average luminous reflectance of the release film on the surface of the side on which the release layer is formed being in the range of 0.5-2.5%, spectral reflectance curve of the release film surface on which the release layer is formed having a local minimal value and no local maximal value in the wavelength region in the range of 400-800 nm, reflection hue of the release film on the side on which the release layer is formed satisfying both $-8 \leq a^* \leq 8$ and $-16 \leq b^* \leq 8$ in the L*a*b* color coordinate system.

5 Claims, 14 Drawing Sheets

RELEASE FILM AND STACKED BODY

This application is a continuation of International Application No. PCT/JP2009/055864, filed Mar. 24, 2009, which is incorporated herein by reference in its entirety.

BACKGROUND OF THE INVENTION

1. Field of the Invention

The present invention relates to a release (coated) film which has an anchor layer and a release layer in this order on at least one surface of a film substrate. Specifically, the present invention relates to a medical release film for, for example, applying an external medicine and a release film for a component of a display device such as PDP (Plasma Display Panel) and OLED (Organic Light Emitting Diode) display or a polarizing plate for LCD (Liquid Crystal Display).

2. Description of the Related Art

Conventionally, release films, which have a release layer on at least one surface of a film substrate, have been widely used as a ceramic green sheet, as release films of a tackiness label paper, a tackiness film, an LCD polarizing plate and a tackiness optical display component of a PDP or an OLED display, and as a medical release film for applying an external medicine. These release films have a release layer of silicone resin coated and formed on at least one surface of a plastic film.

<Patent document 1>: JP-A-H11-300897.
<Patent document 2>: JP-A-H9-156060.
<Patent document 3>: JP-A-H7-003215.

As display devices such as LCD tend to be larger in area and higher in resolution in recent years, higher quality appearance and higher capability of preventing defects caused by foreign materials are required in the display devices. In the case where the release film is applied to a tackiness polarizing plate or a protection film of an optical component such as retardation film, it is necessary for the release film to have no or few foreign materials. A foreign material on the optical component may cause an error in displaying an image.

Similarly, in the case where the release film is used together with a medical sheet for, for example, applying an external medicine, it is necessary to leave no or few foreign materials on the release film. In addition, in the case where the release film is stuck together with a tackiness layer of a tackiness label paper or tackiness film, it is also necessary to leave no or few foreign materials on the release film.

After the release layer is coated on a substrate and heated to cure, an inspection searching for a foreign material or a defect on the release film is performed as an in-line process or as an off-line process in such a way that inspection equipment analyzes a camera image or an inspector performs a visual check. Depending on the circumstances, the inspection might be performed after the release film is stuck to its main body.

In this inspection, mechanical problems sometimes occurred while the inspection equipment searched for a foreign material. In the case where the inspection is performed with human eyes, problems such as a decrease in efficiency etc. sometimes occurred due to the inspector's nauseousness and/or eyestrain.

In addition, in some types of release films, a print layer is arranged on the opposite surface of the (transparent) film substrate or between the film substrate and the release layer so as to provide the release film with the capability of showing a character, a message, a design and/or a decorative pattern etc. and a high design effect (including aesthetic appearance). Particularly in the case of a medical release film, the print layer tends to be arranged in order to display a drug name, application considerations, warnings, a trademark and/or a logo etc. In such a case, an unclear display and/or a faint image etc. as well as a poor design effect and/or ugly appearance sometimes occurred.

In addition, an anchor layer is arranged in the release film in order to improve adhesiveness between the film substrate and the release layer. The anchor layer provides long-term preservation stability to the release film after the release film is manufactured. In particular, in the case where the release film is used for medical application, it is preferable to form the anchor layer between the film substrate and the release layer in order to prevent the drug from degrading with time.

In the case of a release film in which the anchor layer is formed, however, it is sometimes still more difficult to perform the inspection searching for any foreign materials and defects than in the case of a release film in which the release layer is directly formed on the film substrate without arranging any anchor layer therebetween. In addition, in the case of the release film in which the anchor layer is formed, an image printed within the print layer sometimes appears still less vivid or unclear than in the case of the release film in which the release layer is directly formed on the film substrate without arranging any anchor layer therebetween when the print layer is formed.

SUMMARY OF THE INVENTION

Thus, it is an objective of the present invention to provide a release film having a release layer on at least one surface of a film substrate, being excellent in long-term preservation stability while maintaining its stripping performance, being inspected for foreign materials and defects easily, and having the capability of displaying a clear image and a high design effect (including aesthetic appearance) in the case where a print layer is arranged.

The inventors of the present invention found that it is possible to improve adhesiveness between the substrate film and the release layer by arranging an anchor layer therebetween so as to provide the release film with excellent long-term preservation stability. Moreover, the inventors found that in the case where reflection light from the surface of a release film in which an anchor layer and a release layer are formed in order on a film substrate is strong and/or undesirably colored, and/or has color unevenness, it becomes difficult to inspect for a foreign material on the release film and the release film loses the capability of showing a clear image with its print layer. As a result, the object of the present invention mentioned above was achieved.

In order to achieve the objective described above, a first aspect of the present invention is a release film including a film substrate, an anchor layer, and a release layer, the anchor layer and the release layer being formed in order on said film substrate, average luminous reflectance of said release film on a surface of a side on which said release layer is formed being in the range of 0.5-2.5%, a spectral reflectance curve of said release film on the surface of the side on which said release layer is formed having a local minimal value and no local maximal value in the wavelength of 400-800 nm, and a reflection hue of said release film on the side on which the release layer is formed satisfying both $-8 \leqq a^* \leqq 8$ and $-16 \leqq b^* \leqq 8$ in the $L^*a^*b^*$ color coordinate system.

In addition, a second aspect of the present invention is the release film according to the first aspect of the present invention, wherein a refractive index of the release layer is smaller than a refractive index of the film substrate, the difference in refractive index between the release layer and the substrate is in the range of 0.04-0.27, an optical thickness of the release layer is in the range of 113-225 nm, and an optical thickness of said anchor layer is in the range of 5-45 nm.

In addition, a third aspect of the present invention is the release film according to the first or second aspect of the present invention, wherein a print layer is formed on an opposite surface of the release film from the side on which the release layer is formed.

In addition, a fourth aspect of the present invention is a stacked body including the release film according to any one of the first to third aspects of the present invention and a base substance, a surface of the base substance contacting with a surface of the release layer of the release film.

It is possible to provide the release film with adhesiveness between the film substrate and the release layer, long-term preservation stability, suitability for the inspection for foreign materials, and high capability of showing an image and a high design effect (including aesthetic appearance) in the case where a print layer is formed.

DESCRIPTION OF REFERENCE NUMERALS AND SIGNS

Figure 1:
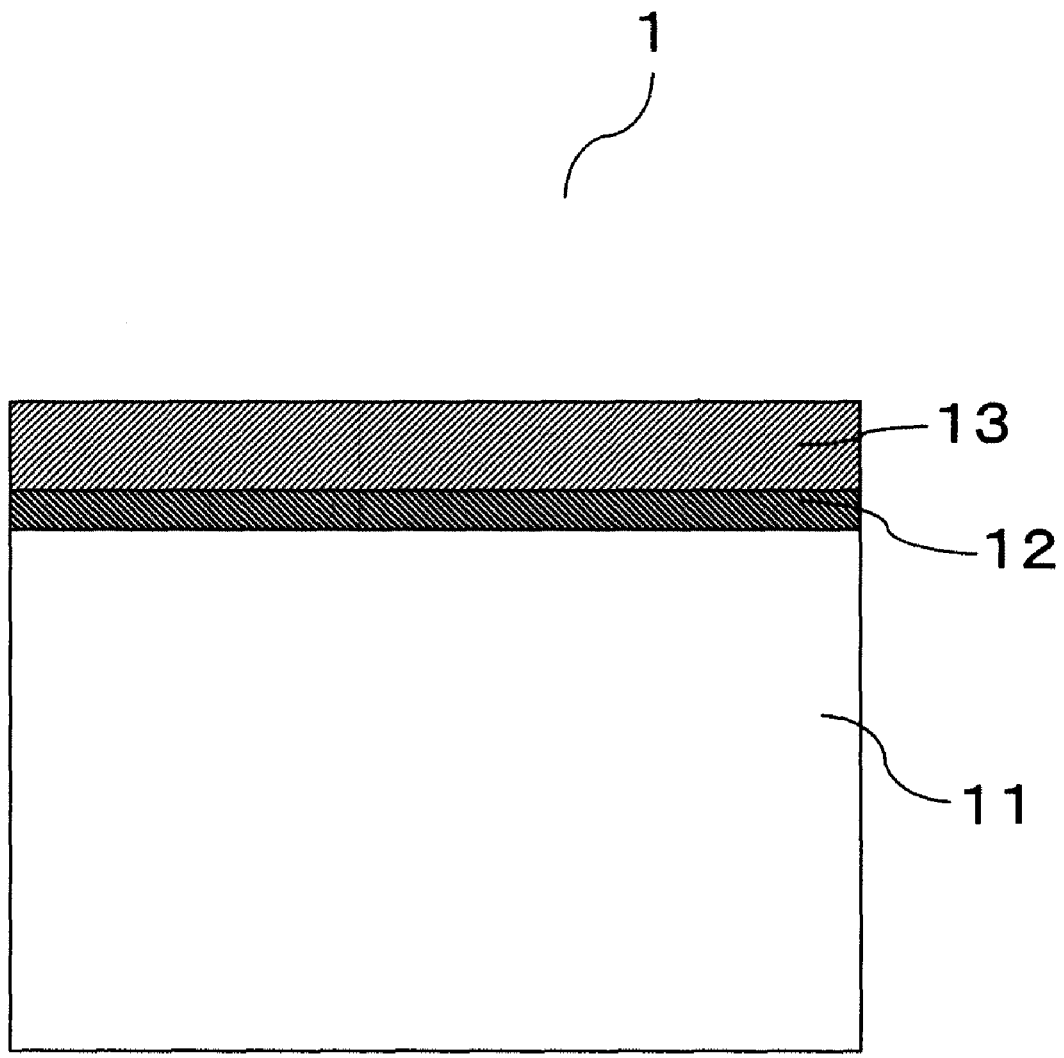
FIG. 1 is an explanatory cross section diagram of a release film according to an embodiment of the present invention.

1: Release film
11: Film substrate
12: Anchor layer
13: Release layer
14: Print layer
2: Base substance

DESCRIPTION OF PREFERRED EMBODIMENTS

A release film of the present invention is described below.

FIG. 1 illustrates an explanatory diagram of a release film of the present invention. It is a feature of a release film 1 of the present invention that an anchor layer 12 and a release layer 13 are formed in order on at least one surface of a film substrate 11. At this time, the release layer 13 is formed as the outermost layer.

It is possible to provide the release film of the present invention with adhesiveness between the film substrate and the release layer by arranging an anchor layer so that the release film has excellent long-term preservation stability. In the case where the release film lacks the anchor layer on the film substrate, a problem in which the release layer drops off occurs due to insufficient adhesiveness between the film substrate and the release layer.

It is a feature of a release film of the present invention that average luminous reflectance of a release film on a surface on which the release layer is arranged is in the range of 0.5-2.5%, a spectral reflectance curve of the release film on the surface on which the release layer is arranged has one local minimal value and no local maximal value in the wavelength region of 400-800 nm, and reflection hue in the L*a*b* color coordinate system of the release film on the surface on which the release layer is arranged satisfies both $-8 \leqq a^* \leqq 8$ and $-16 \leqq b^* \leqq 8$.

Figure 2:
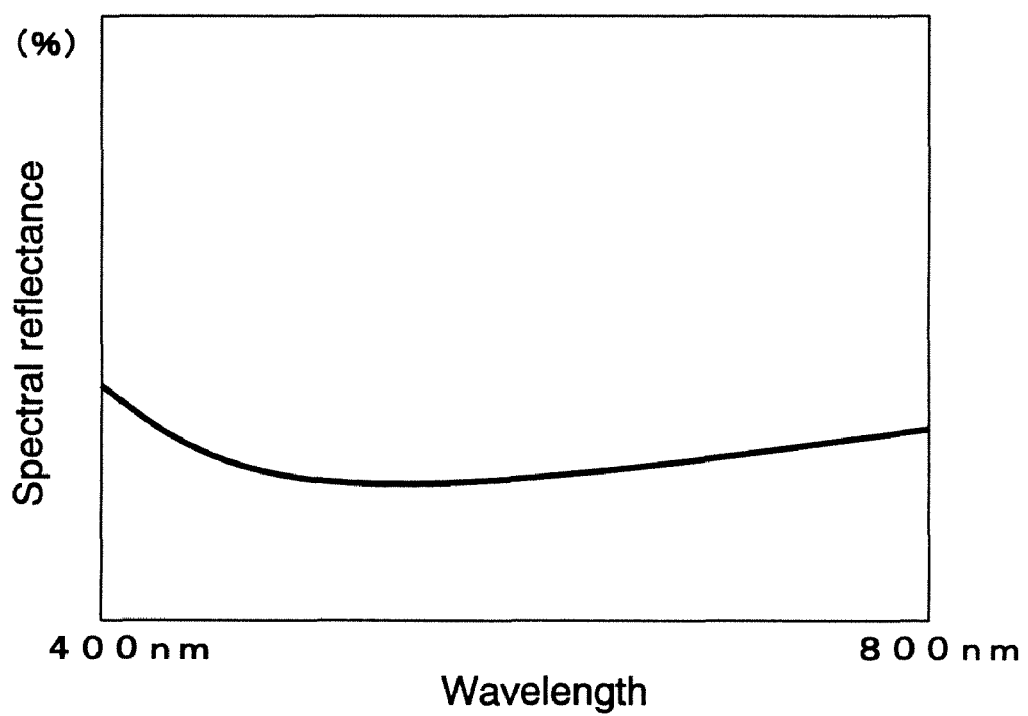
FIG. 2 is an explanatory spectral reflectance curve (model) of a release film according to an embodiment of the present invention.

FIG. 2 illustrates an explanatory diagram of the spectral reflectance curve (model) of a release film of the present invention. The spectral reflectance curve of the release film on a surface on which the release layer is arranged is measured with a spectral photometer after the opposite surface of the film substrate from the surface on which the release layer is arranged is coated with a matte-black paint. The spectral reflectance curve of the release film of the present invention is obtained under a condition that an incident angle of the light source is adjusted to 5 degrees from a direction normal to the surface of the release film, the c light source is used as the light source, and the field of view is 2 degrees. The average luminous reflectance of a release film of the present invention is obtained by correcting reflectance at various wavelengths in the visible region with relative luminosity and averaging. At this time, the photopic standard relative luminosity is used as the relative luminosity. The reflection hue of a release film of the present invention is obtained from the resultant spectral reflectance curve.

It is possible to obtain a U-shaped spectral reflectance curve which has low reflectance values and which moderately decreases toward a local minimal value and turns to moderate increasing as the wavelength becomes longer, in the present invention, by making the release film to have average luminous reflectance in the range of 0.5-2.5% on the surface on which the release layer is arranged and to have spectral reflectance curve with one local minimal value and no local maximal value in the wavelength region of 400-800 nm.

In the present invention, low reflective light with the average luminous reflectance in the range of 0.5-2.5% can make it difficult for an observer to perceive color unevenness and/or discern undesirable coloring. In addition, a U-shaped spectral reflectance curve having extremely moderate variations can make it difficult for an observer to perceive an occurrence of color unevenness caused by small thickness variations of the release layer.

The release layer of a release film of the present invention is formed by a wet coating method. In the case where the release layer is formed by a wet coating method, in-plane thickness unevenness is liable to be produced in the release layer. At this time, in the case where reflectance variations are large relative to wavelength, color unevenness of the release layer becomes large and tends to be perceivable as the spectral reflectance curve varies in accordance with thickness variations in the release layer. In the present invention, however, it is possible to obtain a release film which appears almost uncolored by making the release film to have a U-shaped spectral reflectance curve with extremely moderate variations. Moreover, in the present invention, it is also possible to obtain a release film in which color unevenness generally caused by a variation in thickness of the release layer formed by a wet coating method hardly occurs by making the release film to have a U-shaped spectral reflectance curve with extremely moderate variations.

In a release film which has a steep incline in the spectral reflectance curve, a variation in spectral reflectance curve caused by a variation in thickness in the release layer formed by a wet coating method becomes large. Thus, the release film is liable to have a significant coloring variation and/or color unevenness caused by a variation in thickness of the release layer formed by a wet coating method.

In the case where the release film has only an insignificant coloring or slight color unevenness, foreign materials and defects are stably detected even when the inspection for foreign materials and defects on the release film is performed by an image analysis using a camera etc. In addition, when the inspection for foreign materials and defects on the release film is visually performed, the inspection becomes easier for the inspectors if the release film has only an insignificant coloring or slight color unevenness.

It is feature of a release film of the present invention that the average luminous reflectance on the surface of the release film on which the release layer is arranged is in the range of 0.5-2.5%. By adjusting the average luminous reflectance of the release film within this range, it is possible to reduce reflection light on the release film so that a release film which is suitable for the inspection for foreign materials and defects and which has excellent design effects (including aesthetic appearance) when a print layer is formed in the release film is obtained.

In the case where the average luminous reflectance of the release film exceeds 2.5%, it is difficult to detect foreign materials with reflection light in the inspection for foreign materials and defects due to a strong reflection light on the surface of the release film. In addition, the design effects (including aesthetic appearance) of the release film also decrease. The smaller the average luminous reflectance is, the weaker the reflection light reflected on the surface of the release film becomes. In a release film of the present invention, it is possible to weaken the reflection light which is reflected on the surface of the release film by adjusting the average luminous reflectance to 2.5% or less so that the color unevenness of the release film is reduced.

In the case where the average luminous reflectance is lower than 0.5%, however, the local minimal value of the spectral reflectance curve becomes extremely low and thus the spectral reflectance curve includes a steep slope when the spectral reflectance curve is made to have one local minimal value and no local maximal value in the wavelength range of 400-800 nm. As a result, a variation in the spectral reflectance curve caused by a variation in thickness of the release layer formed by a wet coating method becomes large. Accordingly, the resultant release film has a large coloring variation and color unevenness due to a variation in thickness of the release layer formed by a wet coating method.

In addition, it is a feature of a release film of the present invention that the spectral reflectance curve on the surface on which the release layer is arranged has one local minimal value and no maximal value in the wavelength region of 400-800 nm. Therefore, the spectral reflectance curve of a release film of the present invention is U-shaped. If the shape of the spectral reflectance curve belongs to other types, for example, monotone increasing, monotone decreasing, N-shape and W-shape etc., the spectral reflectance curve has a steep variation and thus the resultant release film inevitably includes color unevenness.

In addition, it is noted in a release film of the present invention that the reflection hue on the surface of the release film of the present invention on which the release layer is arranged satisfies both $-8 \leq a^* \leq 8$ and $-16 \leq b^* \leq 8$ in the $L^*a^*b^*$ color coordinate system.

It is possible to obtain a colorless release film by adjusting the reflection hue of the release film to the above described range. In the $L^*a^*b^*$ color coordinate system, it is possible to make the release film colorless by setting each $a^*$ and $b^*$ close to 0. In a release film of the present invention, however, $a^*=0$ and $b^*=-4$ is the center value of the reflection hue available for designing. It is possible in the present invention to set the color of the center value blue so that it becomes difficult not only to perceive color unevenness but also to perceive coloring, and it is easy to perform the inspection and the resultant release film has a high design effect (including aesthetic appearance) by adjusting the center value of the color distribution of the reflection hue when designing to $a^*=0$ and $b^*=-4$. When $b^*$ is larger than 8, the color becomes yellow, which is apparently different from the blue of the center value of the reflection hue in designing, and an observer can easily perceive the undesirable coloring. On the other hand, when $b^*$ is less than $-16$, the coloring is significantly enriched although the reflection color tone is kept bluish. When $a^*$ exceeds 8, the color becomes a deeper red whereas when $a^*$ is less than $-8$, the color becomes a deeper green.

In a release film of the present invention, it preferable that the refractive index of the release layer is lower than that of the film substrate by a difference in the range of 0.04-0.27, the optical thickness of the release layer is in the range of 113-225 nm and the optical thickness of the anchor coat layer is in the range of 5-45 nm.

By using a release layer which has a refractive index lower than that of the film substrate by a value in the range of 0.04-0.27 and which has an optical thickness in the range of 113-225 nm as an anti-reflection layer by optical interference, and by making the anchor layer to have a thickness in the range of 5-45 nm so as to decrease the optical influence of the anchor layer, it is possible to easily obtain a release film in which the average luminous reflectance is in the range of 0.5-2.5%, the spectral reflectance curve has one local minimal value and no local maximal value in the wavelength region of 400-800 nm, and the reflection hue satisfies both $-8 \leq a^* \leq 8$ and $-16 \leq b^* \leq 8$ in the $L^*a^*b^*$ color coordinate system.

In a release film of the present invention, it is possible to use the release layer as the anti-reflection layer by making the refractive index of the release layer lower than that of the film substrate by a value in the range of 0.04-0.27. In addition, it is possible to easily provide the release film with such a high anti-reflection property as 2.5% or less of luminous reflectance by making the difference in refractive index between the release layer and the film substrate 0.04 or more. In fact, the greater the difference in refractive index between the release film and the film substrate is, the higher the anti-reflection property of the resultant release film becomes. In the case where the difference of the refractive index exceeds 0.27, however, it may be impossible to maintain the spectral reflectance curve having the extremely moderate variations and the U-curve shape.

A silicone material can be preferably used as a forming material of the release layer in the release film of the present invention. In addition, a film of polyethylene terephthalate or polypropylene can be preferably used as the film substrate of the present invention. It is possible to make the refractive index of the release layer lower than that of the film substrate by a difference in the range of 0.04-0.27 in the case where a silicone material is used as the forming material of the release layer and a film of polyethylene terephthalate or polypropylene is used as the film substrate.

It is preferable in the present invention that the release film is designed to have a release layer with an optical thickness between approximately λ/4 and λ/2 where λ=450 nm. Specifically, it is preferable that the release layer having an optical thickness between 113-225 nm is provided to perform as an anti-reflection layer which uses optical interference. In the case where the optical thickness of the release layer exceeds 225 nm, it is difficult to prevent the release film from having color unevenness and getting colored because it is impossible to make the average luminous reflectance of the film within the range of 0.5-2.5% and to keep the reflectance curve of the film in a U-shaped moderate curve in the visible light region. In the case where the optical thickness of the release layer is less than 113 nm, it is difficult to decrease the reflectance of the film to 2.5% or less. In addition, the release layer may have insufficient stripping performance and insufficiently released or peeled although it should intrinsically be released or peeled. Hence, it is preferable that the optical thickness of the release layer is in the range of 113-225 nm.

In addition, the anchor layer of the present invention is preferred to be formed to have an optical thickness in the range of 5-45 nm. In the case where the optical thickness exceeds 45 nm, complex optical designing is required since an influence of the anchor layer to the optical properties of the release film is not negligible. In other words, it becomes so difficult to make the average luminous reflectance in the range of 0.5-2.5% and to keep the reflectance curve being a U-shaped moderate curve in the visible light region that it is impossible to prevent the release film from obtaining color unevenness and getting colored. The anchor layer does not influence the optical properties of the release film of the present invention if the optical thickness of the anchor layer is 45 nm or less. On the other hand, the anchor layer may not be formed in part if the optical thickness of the anchor layer is less than 5 nm because of difficulty in forming the anchor layer with in-plane uniformity. In addition, the anchor layer may also lack sufficient capability of improving the adhesiveness between the film substrate and the release layer, which is an intrinsic property of the anchor layer. Thus, it is preferable that the optical thickness of the anchor layer is in the range of 5-45 nm.

Color unevenness and coloring is more liable to occur in a release film having an anchor layer and a release layer in order on the film substrate due to an optical interference between the release layer and the anchor layer than a release film having a release layer directly on the film substrate. The present invention has achieved a reduction of color unevenness and coloring of the release film by serving the release layer to perform as an anti-reflection layer which uses an optical interference.

Function layers other than those noted above can also be arranged in the release film of the present invention. Such function layers can be arranged, for example, on a surface on which the release layer is not formed or between the release layer and the film substrate. It is preferable that the function layer is arranged on the other surface of the release film from the side on which the release layer is arranged in order to maintain optical characteristics which are attributed to the release layer and the anchor layer. A print layer, for example, can be arranged as the function layer.

Figure 3:
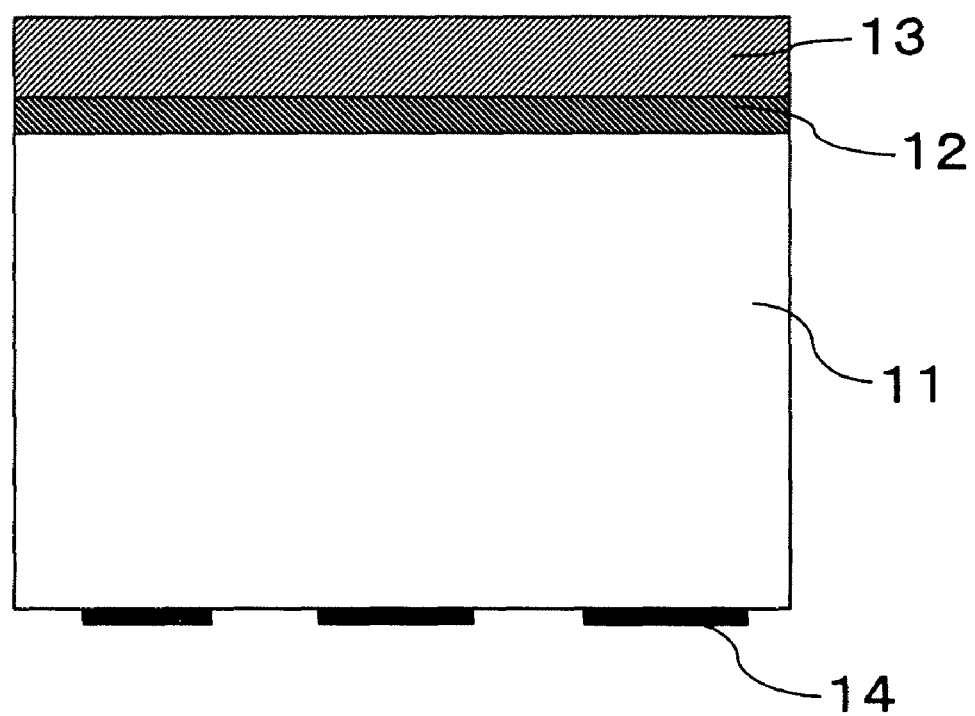
FIG. 3 is an explanatory cross section diagram of a release film according to another embodiment of the present invention.

FIG. 3 illustrates an explanatory cross section diagram of another embodiment of a release film of the present invention. It is a feature of the release film 1 of the present invention that an anchor layer 12 and a release layer 13 are arranged in order on at least one surface of a film substrate 11. At this time, the release layer 13 is arranged as the outermost layer of the release film. In addition, a print layer 14 is arranged on the other surface of the film substrate 11 from the side on which the release layer 13 is arranged. Since color unevenness and coloring are prevented, a print layer can be preferably formed in a release film of the present invention without decreasing a design effect (including aesthetic appearance).

Figure 4:
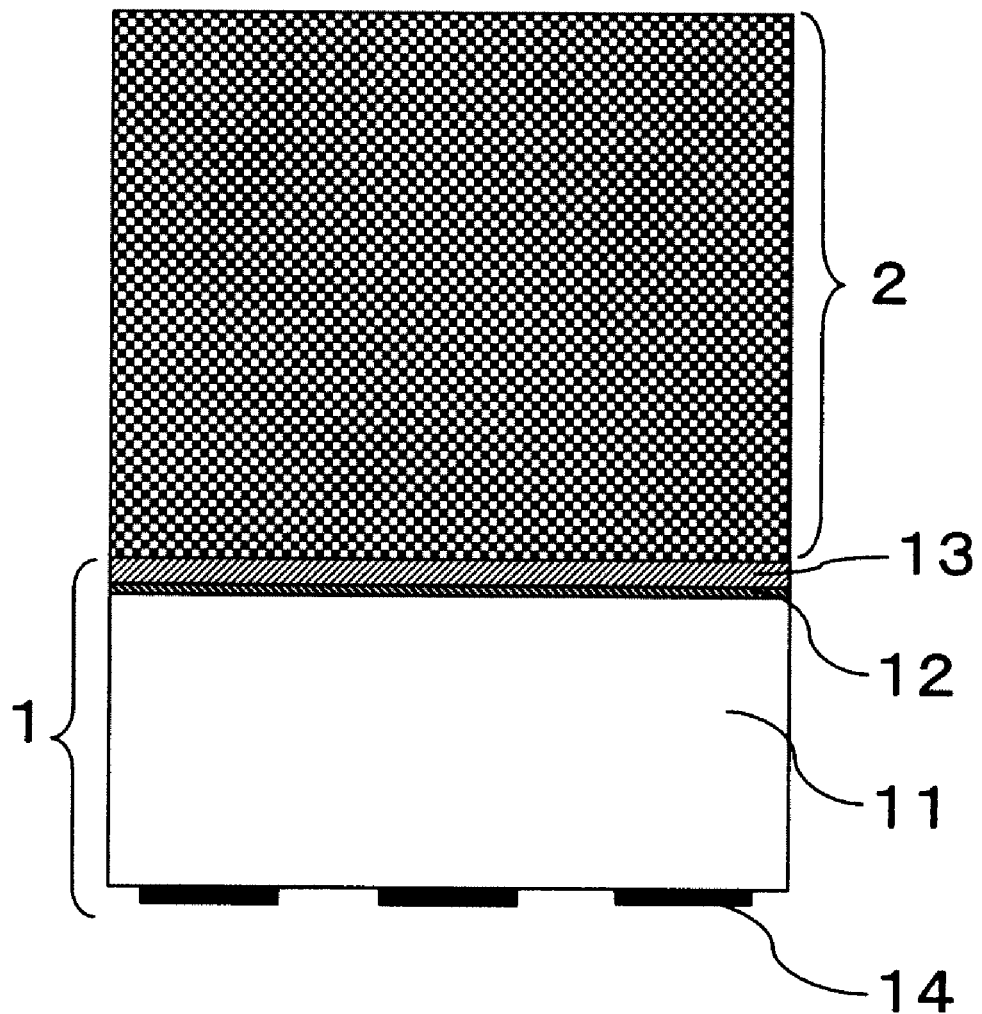
FIG. 4 is an explanatory cross section diagram of a stacked body according to an embodiment of the present invention.
Figure 5:
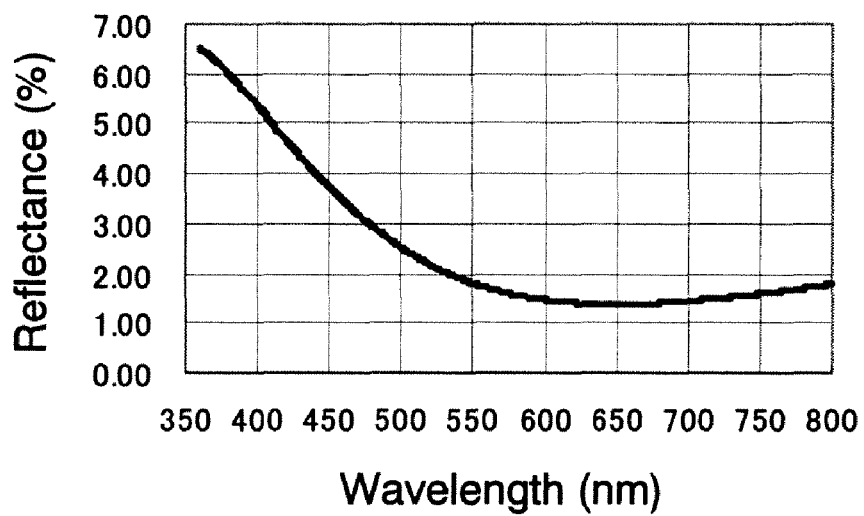
FIG. 5 is a spectral reflectance curve of a release film of Example 1 of the present invention.
Figure 6:
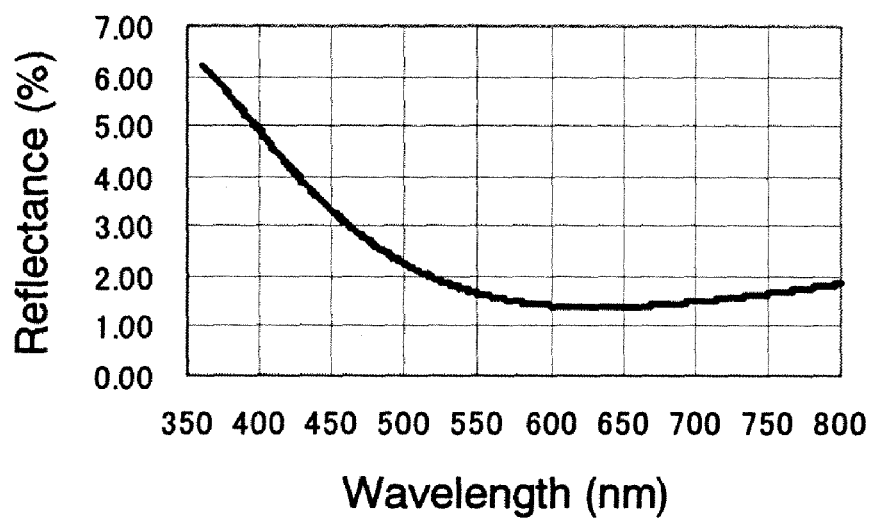
FIG. 6 is a spectral reflectance curve of a release film of Example 2 of the present invention.
Figure 7:
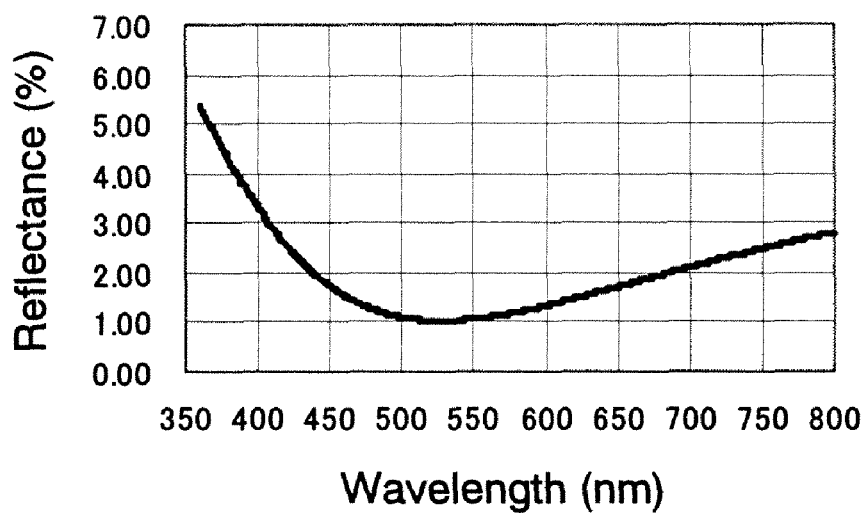
FIG. 7 is a spectral reflectance curve of a release film of Example 3 of the present invention.
Figure 8:
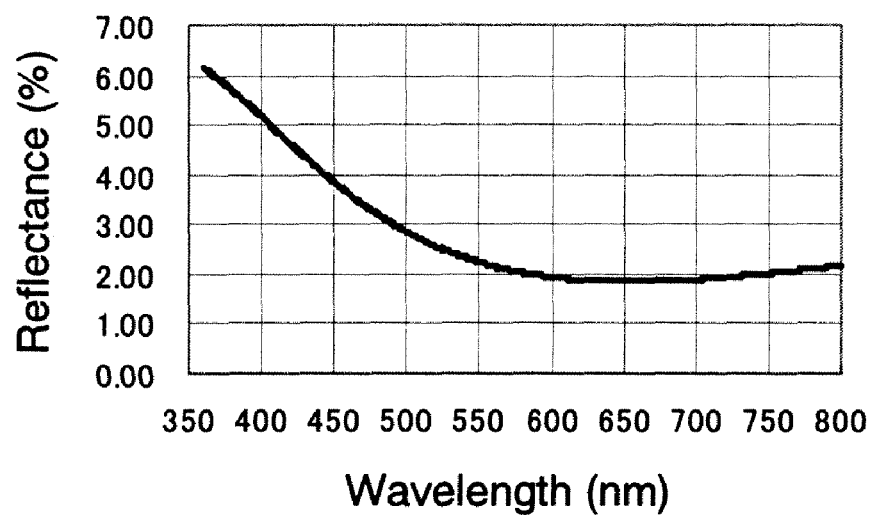
FIG. 8 is a spectral reflectance curve of a release film of Example 4 of the present invention.
Figure 9:
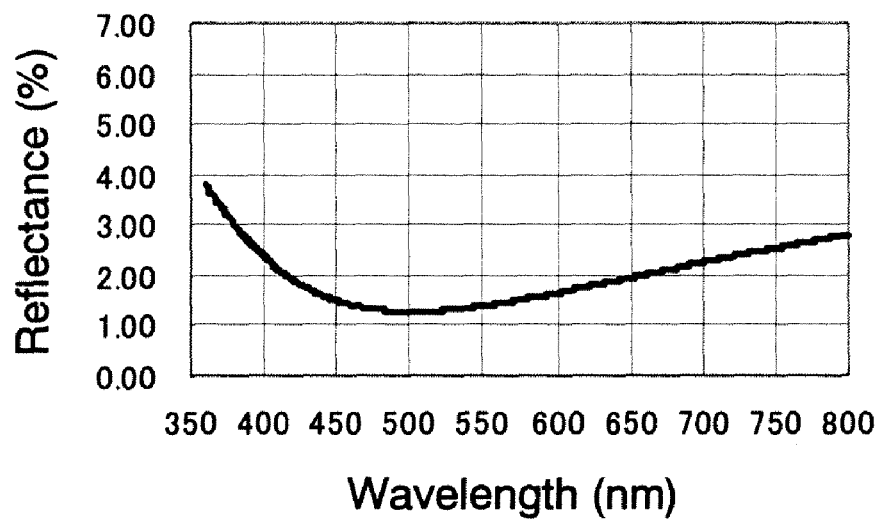
FIG. 9 is a spectral reflectance curve of a release film of Example 5 of the present invention.
Figure 10:
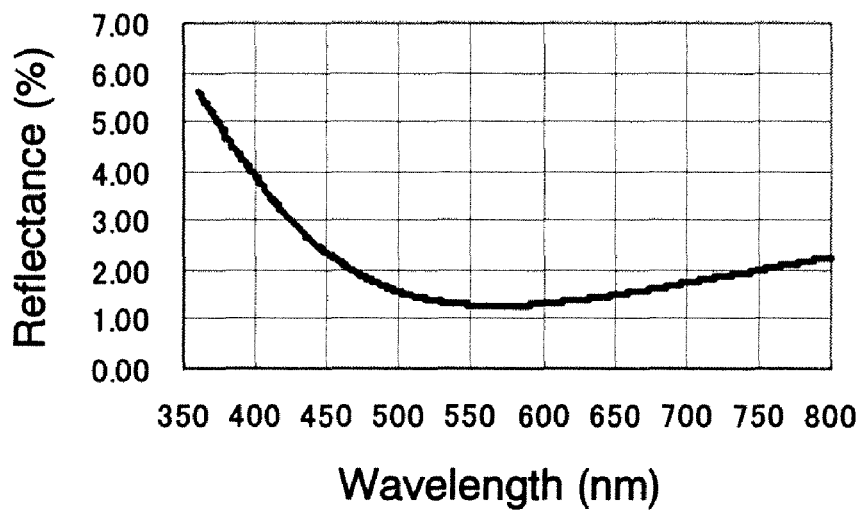
FIG. 10 is a spectral reflectance curve of a release film of Comparative example 1 of the present invention.
Figure 11:
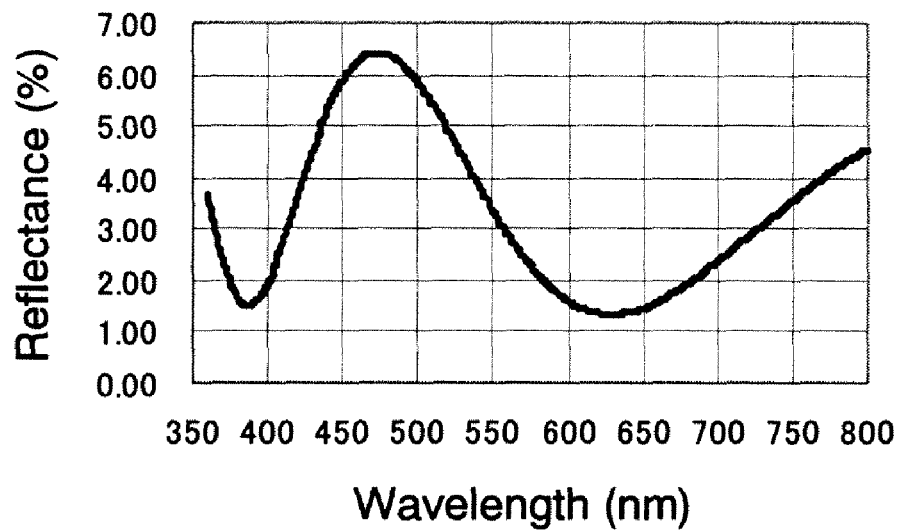
FIG. 11 is a spectral reflectance curve of a release film of Comparative example 2 of the present invention.
Figure 12:
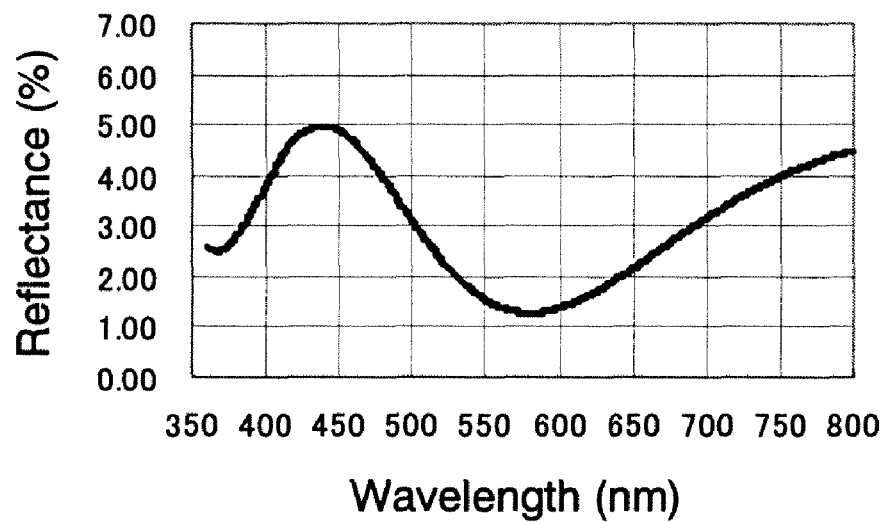
FIG. 12 is a spectral reflectance curve of a release film of Comparative example 3 of the present invention.
Figure 13:
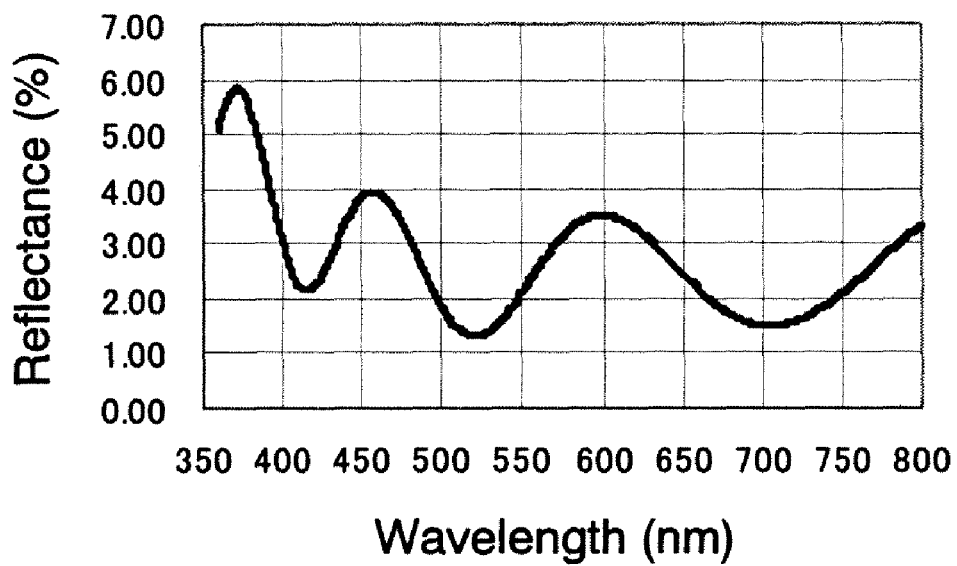
FIG. 13 is a spectral reflectance curve of a release film of Comparative example 4 of the present invention.
Figure 14:
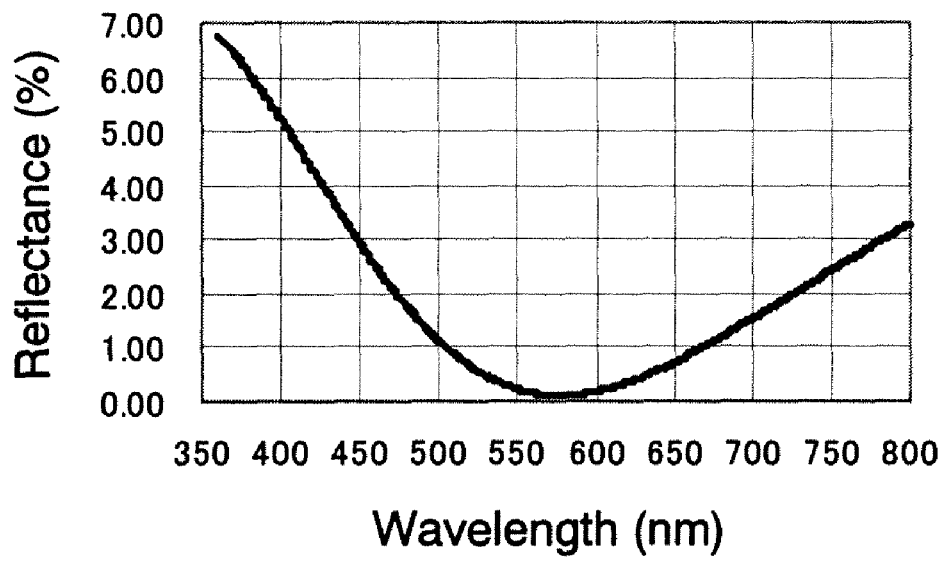
FIG. 14 is a spectral reflectance curve of a release film of Comparative example 5 of the present invention.

FIG. 4 illustrates a cross sectional explanatory diagram of a stacked body of the present invention. The stacked body is obtained by sticking a surface of a release layer 13 together with a surface of a base substance 2. An example of the base substance 2 is a material which has a tackiness layer on the surface. The tackiness layer of the base substance 2 is stuck to and covered by the release layer of the release film 1 in order to maintain its tackiness and to prevent foreign materials from collecting on the surface.

A tackiness tape, a tackiness sheet, a display device component which has a tackiness layer on the surface such as a certain type of LCD (Liquid Crystal Display) polarizing plate, PDP (plasma display panel) and organic electroluminescence panel etc., and a medical sheet and a medical film for applying an external medicine etc. can be used as the base substance.

A release film of the present invention can be used as a protection film which maintains tackiness on the surface of the base substance and prevents foreign materials from sticking to the surface of the base substance.

Next, a manufacturing method of a release film of the present invention is described.

Polyolefin films such as polyethylene film and polypropylene film etc., polyester films such as PET (polyethylene terephthalate) film and PEN (polyethylene naphthalate) film etc., cellulose films such as triacetyl cellulose film, diacetyl cellulose film and cellophane film etc., polyamide films such as 6-nylon and 6,6-nylon etc., acrylate films such as polymethyl methacrylate film etc., and other films of organic polymer such as polystyrene film, polyvinyl chloride film, polyimide film, polyvinyl alcohol film, polycarbonate film and ethylene vinyl alcohol film etc. can be used as the film substrate which is used for a release film of the present invention. In particular, PET film and polypropylene film can be preferably used considering process stability, heat resistance and adhesiveness.

In addition, the film substrate may have a stacked structure. If necessary, anti-oxidant, colorant, dye and/or pigment etc. can be added to the film substrate. A film substrate in which a print layer is preliminarily formed can also be used.

An anchor layer is formed on the film substrate. In a release film of the present invention, the anchor layer is formed by coating a liquid of anchor layer forming material on the film substrate.

The anchor layer forming material of the present invention can be suitably selected from materials for a primer of a plastic film such as epoxy chelate compounds, polyester urethane chelate compounds, acrylic urethane chelate compounds, silane coupling chelate compounds and titanium chelate compounds etc. For example, any of polyester resins and acrylic resins such as Seikadyne PET primer made by Dainichiseika Color and Chemicals Mfg. Co., Ltd., G588 gloss made by DIC Corporation, BLS-PC 50 made by Toyo-Morton, Ltd., and Vylon UR 1350 and Vylon UR 3200 made by Toyobo Co., Ltd. etc. or a combination of these with an isocyanate curing agent can be used. In addition, an example of the silane coupling compounds is BY24-846 (three-liquid (B, C and E) system) made by Dow Corning Toray Co., Ltd., a mixed primer of glycidoxypropyltrimethoxysilane, methacryloxytrimethoxysilane and aluminum chelate. An example of titanium chelate compounds for the anchor layer forming material is Orgatics TC-100 by Matsumoto Fine Chemical Co., Ltd.

In addition, if necessary a solvent is added to the anchor layer forming material. Coating suitability can be improved by this addition of the solvent. The solvent is suitably selected considering coating suitability etc. from aromatic hydrocarbons such as toluene, xylene and cyclohexylbenzene etc., hydrocarbons such as n-hexane and cyclohaxane etc., ethers such as dibutyl ether, dimethoxymethane, dimethoxyethane, diethoxyethane, propylene oxide, dioxane, dioxolane, trioxane, tetrahydrofuran, anisole and phenetol etc., ketones such as methyl isobutyl ketone, methyl butyl ketone, acetone, methyl ethyl ketone, diethyl ketone, dipropyl ketone, diisobytyl ketone, cyclopentanone, cyclohexanone and methylcyclohexanone etc., esters such as ethyl formate, propyl formate, n-pentyl formate, methyl acetate, ethyl acetate, methyl propionate, ethyl propionate, n-pentyl acetate and y-butylolactone, etc., cellosolves such as methyl cellosolve, ethyl cellosolve, butyl cellosolve and cellosolve acetate, etc., alcohols such as methanol, ethanol, n-propyl alcohol, isopropyl alcohol and ethylene glycol etc., and water etc.

The anchor layer forming material of the present invention is coated on the film substrate by a wet coating method in a coating process to form the anchor layer. At this time, a drying process for removing solvent after the coating process is arranged if necessary. In addition, a heating process and an ionizing radiation irradiation process are arranged. Coating methods employing a roll coater, reverse roll coater, gravure coater, micro gravure coater, knife coater, bar coater, wire bar coater, die coater and dip coater can be used as the coating method of the anchor layer forming material in the coating process.

Next, a release layer is formed on the film substrate on which the anchor layer is formed. A release layer in the present invention is formed by coating a liquid of release layer forming material on the film substrate on which the anchor layer has already been formed.

Considering adhesiveness to the film substrate, coating suitability, and stripping performance, silicone materials can be preferably used as the release layer forming material of the present invention. Cure reaction type of silicone coating materials for a release film which cure by the addition of a reactive component or by irradiation of UV light etc. can be used as the silicone materials for the release layer forming materials. Specifically, SRX211, LTC750A, LTC760A and BY24-510 made by Dow Corning Toray Co., Ltd., KS774, KS847 and KS5598 made by Shin-Etsu Chemical Co., Ltd., TPR6700, TPR6702, TPR6710, TPR6721 and TPR6500 made by Momentive Performance Materials Inc., UV-POLY200 and UV-POLY201 made by Arakawa Chemical Industries, Ltd., etc. can be used although the present invention is not limited to these. In addition, fluorocompounds also can be used as the release layer forming materials.

In addition, depending on the type of curing, various curing catalysts for curing and/or photo-initiator are admixed if necessary. For example, in the case where silicone coating materials for a release film are used as the release layer forming material, SRX212, NC-25 and BY24-835 made by Dow Corning Toray Co., Ltd., PL-50T made by Shin-Etsu Chemical Co., Ltd., CM670 and UV9380 made by Momentive Performance Materials, Inc. UV-CATA211 made by Arakawa Chemical Industries, Ltd. etc. can be used as the curing catalyst or photo-initiator.

In addition, if necessary a solvent is added to the release layer forming material. Coating suitability can be improved by this addition of the solvent. The solvent is suitably selected considering coating suitability etc. from aromatic hydrocarbons such as toluene, xylene and cyclohexylbenzene etc., hydrocarbons such as n-hexane and cyclohaxane etc., ethers such as dibutyl ether, dimethoxymethane, dimethoxyethane, diethoxyethane, propylene oxide, dioxane, dioxolane, trioxane, tetrahydrofuran, anisole and phenetol etc., ketones such as methyl isobutyl ketone, methyl butyl ketone, acetone, methyl ethyl ketone, diethyl ketone, dipropyl ketone, diisobytyl ketone, cyclopentanone, cyclohexanone and methylcyclohexanone etc., and esters such as ethyl formate, propyl formate, n-pentyl formate, methyl acetate, ethyl acetate, methyl propionate, ethyl propionate, n-pentyl acetate and y-butylolactone, etc.

In addition, a surface conditioner, leveling agent, adhesiveness improver and photo sensitizer etc. can be added to a liquid of the release layer forming material as an additive.

The release layer forming material of the present invention is coated on the film substrate on which the anchor layer is preliminarily formed by a wet coating method in a coating process. At this time, a drying process for removing solvent after the coating process is arranged if necessary. In addition, an ionizing radiation irradiation process is arranged as a curing process and a heating process is arranged. Coating methods employing a roll coater, reverse roll coater, gravure coater, micro gravure coater, knife coater, bar coater, wire bar coater, die coater and dip coater can be used as the coating method of the anchor layer forming material in the coating process.

Any heretofore known inks can be used as a print layer forming material in the present invention. In the case of polychromatic printing, a plurality of inks may be used. Printing methods such as relief printing, gravure printing (intaglio printing), offset printing, screen printing and ink-jet printing etc. can be used as a forming method of the print layer.

A release film of the present invention is manufactured as described above.

EXAMPLE

Examples are described below. Momentive Performance Materials Inc. may also be referred to simply as Momentive Inc. below.

Example 1

A 75 μm thick bi-axially oriented PET (polyethylene terephthalate) film, Melinex S made by Teijin Inc., was used as the film substrate. An anchor layer forming material which has a composition noted below was coated on the film substrate by a bar coater. After coating, the forming material was dried to cure in an oven at 140° C. for 30 sec. so that the anchor layer was formed. The resultant anchor layer had a thickness of 20 nm.

<Anchor Layer Forming Material (Coating Liquid)>
    4 parts by weight of glycidoxypropyltrimethoxysilane
    1 part by weight of Orgatics TC-100 made by Matsumoto Fine Chemical Co., Ltd.
    500 parts by weight of toluene Subsequently, a release layer forming material having a composition noted below was coated by a bar coater on the film substrate on which the anchor layer had been formed. After coating, the forming material was dried to cure in an oven at 140° C. for 1 min. so that the release layer was formed. The resultant release layer had a thickness of 100 nm.

<Release Layer Forming Material>

10 parts by weight of TPR6702 (silicone coating material) made by Momentive Inc.

0.1 parts by weight of CM670 (catalyst for curing) made by Momentive Inc.

60 parts by weight of toluene 30 parts by weight of n-hexane

The release film of Example 1 was manufactured in this way.

Example 2

A 75 μm thick bi-axially oriented PET (polyethylene terephthalate) film, Melinex S made by Teijin Inc., was used as the film substrate. An anchor layer forming material which has a composition noted below was coated on the film substrate by a bar coater. After coating, the forming material was dried to cure in an oven at 80° C. for 1 min. so that the anchor layer was formed. The resultant anchor layer had a thickness of 20 nm.

<Anchor Layer Forming Material (Coating Liquid)>

4 parts by weight of Seikadyne PET primer (solid content 20 wt %) made by Dainichiseika Color and Chemicals Mfg. Co., Ltd.

48 parts by weight of toluene 48 parts by weight of methyl ethyl ketone

Subsequently, a release layer forming material having a composition noted below was coated by a bar coater on the film substrate on which the anchor layer had been formed. After coating, the forming material was dried to cure in an oven at 140° C. for 1 min. so that the release layer was formed. The resultant release layer had a thickness of 100 nm.

<Release Layer Forming Material>

10 parts by weight of TPR6702 (silicone coating material) made by Momentive Inc.

0.1 parts by weight of CM670 (catalyst for curing) made by Momentive Inc.

60 parts by weight of toluene 30 parts by weight of n-hexane

The release film of Example 2 was manufactured in this way.

Example 3

A 75 μm thick bi-axially oriented PET (polyethylene terephthalate) film, Melinex S made by Teijin Inc., was used as the film substrate. An anchor layer forming material which has a composition noted below was coated on the film substrate by a bar coater. After coating, the forming material was dried to cure in an oven at 140° C. for 1 min. so that the anchor layer was formed. The resultant anchor layer had a thickness of 15 nm.

<Anchor Layer Forming Material (Coating Liquid)>

1 part by weight of Orgatics TC-100 made by Matsumoto Fine Chemical Co., Ltd.

50 parts by weight of toluene 50 parts by weight of methyl ethyl ketone

Subsequently, a release layer forming material having a composition noted below was coated by a bar coater on the film substrate on which the anchor layer had been formed. After coating, the forming material was dried to cure in an oven at 140° C. for 1 min. so that the release layer was formed. The resultant release layer had a thickness of 100 nm.

<Release Layer Forming Material>

10 parts by weight of TPR6702 (silicone coating material) made by Momentive Inc.

0.1 parts by weight of CM670 (catalyst for curing) made by Momentive Inc.

60 parts by weight of toluene 30 parts by weight of n-hexane

The release film of Example 3 was manufactured in this way.

Example 4

A 75 μm thick bi-axially oriented PET (polyethylene terephthalate) film, Melinex S made by Teijin Inc., was used as the film substrate. An anchor layer forming material which has a composition noted below was coated on the film substrate by a bar coater. After coating, the forming material was dried to cure in an oven at 140° C. for 30 sec. so that the anchor layer was formed. The resultant anchor layer had a thickness of 20 nm.

<Anchor Layer Forming Material (Coating Liquid)>

4 parts by weight of glycidoxypropyltrimethoxysilane 1 part by weight of Orgatics TC-100 made by Matsumoto Fine Chemical Co., Ltd.

500 parts by weight of toluene

Subsequently, a release layer forming material having a composition noted below was coated by a bar coater on the film substrate on which the anchor layer had been formed. After coating, the forming material was dried to cure in an oven at 140° C. for 1 min. so that the release layer was formed. The resultant release layer had a thickness of 98 nm.

<Release Layer Forming Material>

4 parts by weight of Silicolease UV POLY200 made by Arakawa Chemical Industries, Ltd.

0.2 parts by weight of Silicolease UV CVATA211 (photo-initiator) made by Momentive Inc.

48 parts by weight of ethyl acetate 48 parts by weight of n-hexane

The release film of Example 4 was manufactured in this way.

Example 5

A 75 μm thick bi-axially oriented PET (polyethylene terephthalate) film, Melinex S made by Teijin Inc., was used as the film substrate. An anchor layer forming material which has a composition noted below was coated on the film substrate by a bar coater. After coating, the forming material was dried to cure in an oven at 140° C. for 30 sec. so that the anchor layer was formed. The resultant anchor layer had a thickness of 10 nm.

<Anchor Layer Forming Material (Coating Liquid)>

4 parts by weight of glycidoxypropyltrimethoxysilane 1 part by weight of Orgatics TC-100 made by Matsumoto Fine Chemical Co., Ltd.

500 parts by weight of toluene

Subsequently, a release layer forming material having a composition noted below was coated by a bar coater on the film substrate on which the anchor layer had been formed. After coating, the forming material was dried to cure in an oven at 140° C. for 1 min. so that the release layer was formed. The resultant release layer had a thickness of 80 nm.

<Release Layer Forming Material>

10 parts by weight of TPR6702 (silicone coating material) made by Momentive Inc.

0.1 parts by weight of CM670 (catalyst for curing) made by Momentive Inc.

60 parts by weight of toluene 30 parts by weight of n-hexane

The release film of Example 5 was manufactured in this way.

Comparative Example 1

A 75 μm thick bi-axially oriented PET (polyethylene terephthalate) film, Melinex S made by Teijin Inc., was used as the film substrate. A release layer forming material which has a composition noted below was coated on the film substrate by a bar coater. After coating, the forming material was dried to cure in an oven at 140° C. for 1 min. so that the release layer was formed. The resultant release layer had a thickness of 100 nm. At this time, no anchor layer was formed.

<Release Layer Forming Material>

10 parts by weight of TPR6702 (silicone coating material) made by Momentive Inc.

0.1 parts by weight of CM670 (catalyst for curing) made by Momentive Inc.

60 parts by weight of toluene 30 parts by weight of n-hexane

The release film of Comparative example 1 was manufactured in this way.

Comparative Example 2

A 75 μm thick bi-axially oriented PET (polyethylene terephthalate) film, Melinex S made by Teijin Inc., was used as the film substrate. An anchor layer forming material which has a composition noted below was coated on the film substrate by a bar coater. After coating, the forming material was dried to cure in an oven at 140° C. for 30 sec. so that the anchor layer was formed. The resultant anchor layer had a thickness of 20 nm.

<Anchor Layer Forming Material (Coating Liquid)>

4 parts by weight of glycidoxypropyltrimethoxysilane 1 part by weight of Orgatics TC-100 made by Matsumoto Fine Chemical Co., Ltd.

500 parts by weight of toluene

Subsequently, a release layer forming material having a composition noted below was coated by a bar coater on the film substrate on which the anchor layer had been formed. After coating, the forming material was dried to cure in an oven at 140° C. for 1 min. so that the release layer was formed. The resultant release layer had a thickness of 319 nm.

<Release Layer Forming Material>

10 parts by weight of TPR6702 (silicone coating material) made by Momentive Inc.

0.1 parts by weight of CM670 (catalyst for curing) made by Momentive Inc.

60 parts by weight of toluene 30 parts by weight of n-hexane

The release film of Comparative example 2 was manufactured in this way.

Comparative Example 3

A 75 μm thick bi-axially oriented PET (polyethylene terephthalate) film, Melinex S made by Teijin Inc., was used as the film substrate. An anchor layer forming material which has a composition noted below was coated on the film substrate by a bar coater. After coating, the forming material was dried to cure in an oven at 140° C. for 30 sec. so that the anchor layer was formed. The resultant anchor layer had a thickness of 200 nm.

<Anchor Layer Forming Material (Coating Liquid)>

2 parts by weight of BY24-846B made by Dow Corning Toray Co., Ltd.

2 parts by weight of BY24-846C made by Dow Corning Toray Co., Ltd.

2 parts by weight of BY24-846E made by Dow Corning Toray Co., Ltd.

94 parts by weight of toluene

Subsequently, a release layer forming material having a composition noted below was coated by a bar coater on the film substrate on which the anchor layer had been formed. After coating, the forming material was dried to cure in an oven at 140° C. for 1 min. so that the release layer was formed. The resultant release layer had a thickness of 100 nm.

<Release Layer Forming Material>

10 parts by weight of LTC750A (silicone coating material) made by Dow Corning Toray Co., Ltd.

0.1 parts by weight of NC-25 (catalyst for curing) made by Dow Corning Toray Co., Ltd.

60 parts by weight of toluene 30 parts by weight of n-hexane

The release film of Comparative example 3 was manufactured in this way.

Comparative Example 4

A 75 μm thick bi-axially oriented PET (polyethylene terephthalate) film, Melinex S made by Teijin Inc., was used as the film substrate. An anchor layer forming material which has a composition noted below was coated on the film substrate by a bar coater. After coating, the forming material was dried to cure in an oven at 80° C. for 1 min. so that the anchor layer was formed. The resultant anchor layer had a thickness of 500 nm.

<Anchor Layer Forming Material (Coating Liquid)>

50 parts by weight of Seikadyne PET primer (solid content 20 wt %) made by Dainichiseika Color and Chemicals Mfg. Co., Ltd.

25 parts by weight of toluene 25 parts by weight of methyl ethyl ketone

Subsequently, a release layer forming material having a composition noted below was coated by a bar coater on the film substrate on which the anchor layer had been formed. After coating, the forming material was dried to cure in an oven at 140° C. for 1 min. so that the release layer was formed. The resultant release layer had a thickness of 100 nm.

<Release Layer Forming Material>

10 parts by weight of TPR6702 (silicone coating material) made by Momentive Inc.

0.1 parts by weight of CM670 (catalyst for curing) made by Momentive Inc.

60 parts by weight of toluene 30 parts by weight of n-hexane

The release film of Comparative example 4 was manufactured in this way.

Comparative Example 5

A 75 μm thick bi-axially oriented PET (polyethylene terephthalate) film, Melinex S made by Teijin Inc., was used as the film substrate. An anchor layer forming material which has a composition noted below was coated on the film substrate by a bar coater. After coating, the forming material was dried to cure in an oven at 140° C. for 30 sec. so that the anchor layer was formed. The resultant anchor layer had a thickness of 80 nm.

<Anchor Layer Forming Material (Coating Liquid)>
6 parts by weight of Orgatics TC-100 made by Matsumoto Fine Chemical Co., Ltd.
50 parts by weight of toluene
50 parts by weight of methyl ethyl ketone Subsequently, a release layer forming material having a composition noted below was coated by a bar coater on the film substrate on which the anchor layer had been formed. After coating, the forming material was dried to cure in an oven at 140° C. for 1 min. so that the release layer was formed. The resultant release layer had a thickness of 100 nm.

<Release Layer Forming Material>
10 parts by weight of TPR6702 (silicone coating material) made by Momentive Inc.
0.1 parts by weight of CM670 (catalyst for curing) made by Momentive Inc.
60 parts by weight of toluene
30 parts by weight of n-hexane The release film of Comparative example 5 was manufactured in this way.

The release films obtained in Example 1 to Example 5 and Comparative example 1 to Comparative example 5 were evaluated as follows.

<Spectral Reflectance Measurement>

Each of the obtained release films was painted with a matte-black spray on the opposite side from the surface on which the release layer was formed. After the painting, spectral reflectance at 5 degrees of incident angle to the surface on which the low refractive index layer was formed was measured using an automated spectral photometer (U-4000 made by Hitachi Ltd.) under a condition of C light source and 2 degrees of field of view. Average luminous reflectance (Y %) and color hue (a*, b*) were calculated from the obtained reflectance curve. The spectral reflectance was measured under the following conditions.

Start wavelength of the measurement: 800.00 nm
End wavelength of the measurement: 800.00 nm
Scan speed: 600 nm/min.
Sampling interval: 1.00 nm
Slit width: 6.00 nm <Color Unevenness Evaluation of the Release Film>

The obtained release film was painted black with a matte-black spray on the opposite surface from the side on which the release layer was formed. After painting, the release film was visually observed (at a point 1.5 meters away from the fluorescent light on the ceiling) to inspect for color unevenness. The evaluation criteria were as follows.

Circle: Color unevenness was not observed.
Cross: Color unevenness was observed.

<Color Unevenness and Design Effect (Aesthetic Appearance) Evaluations of the Release Film Having a Print Layer>

A sample for checking printed-color appearance was made by printing three color gravure inks of white, indigo blue and black made by Toyo Ink Mfg. Co., Ltd. in solids on the opposite surface of an obtained release film from the side on which the release layer was formed. Similar to the case of color unevenness evaluation of the release film described above, this sample was visually observed (at a point 1.5 meters away from the fluorescent light on the ceiling) to inspect for color unevenness etc. The evaluation criteria were as follows.

Circle: Color unevenness and undesirable coloring were not observed and a high level of design effect (aesthetic appearance) was achieved.

Cross: Color unevenness and undesirable coloring were observed and only a low level design effect (aesthetic appearance) was achieved.

<Peel Force Measurement>

A polyester tackiness tape (31B made by Nitto Denko Corporation) was stuck to the obtained release film on the surface on which the release layer was formed and pressed between a pair of glass plates with a load of 20 g/cm$^2$ and left for 5 hours. Then, resistance when the tackiness tape was peeled off to an angle of 180 degrees in a speed of 300 mm/min. was measured by a stretch tester. The size of the test sample was 25 mm×100 mm.

<Adhesion Force Measurement>

The obtained release film was kept for four weeks at a temperature of 40° C. and humidity of 90% in a thermo-hydrostat (or constant temperature and humidity equipment). Then, the release film was taken out from the thermo-hydrostat and received a so-called "rub-off test" in which the film was rubbed with fingers 20 times with a load of 500 gf/cm$^2$. The evaluation criteria were as follows.

Circle: Almost no changes in appearance were found.
Cross: A part of the release layer became white and/or dropped off.

The result is shown in Table 1A to Table 1D

TABLE 1A

| | Film substrate Refractive index [$n_f$] | Anchor layer | | |
|---|---|---|---|---|
| | | Layer thickness (nm) | Refractive index | Optical thickness (nm) |
| Example 1 | 1.67 | 20 | 1.50 | 30 |
| Example 2 | 1.67 | 20 | 1.55 | 31 |
| Example 3 | 1.67 | 15 | 1.80 | 27 |
| Example 4 | 1.67 | 20 | 1.50 | 30 |
| Example 5 | 1.67 | 10 | 1.50 | 15 |
| Comparative example 1 | 1.67 | — | — | — |
| Comparative example 2 | 1.67 | 20 | 1.50 | 30 |
| Comparative example 3 | 1.67 | 200 | 1.50 | 300 |
| Comparative example 4 | 1.67 | 500 | 1.55 | 775 |
| Comparative example 5 | 1.67 | 80 | 1.80 | 144 |

TABLE 1B

| | Release layer | | | Difference $n_f - n_{si}$ |
|---|---|---|---|---|
| | Layer thickness (nm) | Refractive index [$n_{si}$] | Optical thickness (nm) | |
| Example 1 | 100 | 1.44 | 144 | 0.23 |
| Example 2 | 100 | 1.44 | 144 | 0.23 |
| Example 3 | 100 | 1.44 | 144 | 0.23 |
| Example 4 | 98 | 1.47 | 144 | 0.20 |
| Example 5 | 80 | 1.44 | 115 | 0.23 |
| Comparative example 1 | 100 | 1.44 | 144 | 0.23 |
| Comparative example 2 | 319 | 1.44 | 459 | 0.23 |
| Comparative example 3 | 100 | 1.44 | 144 | 0.23 |
| Comparative example 4 | 100 | 1.44 | 144 | 0.23 |
| Comparative example 5 | 100 | 1.44 | 144 | 0.23 |

TABLE 1C

| | Average luminous reflectance (%) | Spectral reflectance curve | | Reflection hue | |
| --- | --- | --- | --- | --- | --- |
| | | Number of local maximal value | Number of local minimal value | a* | b* |
| Example 1 | 1.86 | 0 | 1 | 3.2 | −13.3 |
| Example 2 | 1.73 | 0 | 1 | 3.5 | −12.2 |
| Example 3 | 1.19 | 0 | 1 | 7.0 | −6.1 |
| Example 4 | 2.28 | 0 | 1 | 2.2 | −10.4 |
| Example 5 | 1.46 | 0 | 1 | 3.9 | −0.6 |
| Comparative example 1 | 1.38 | 0 | 1 | 5.0 | −9.1 |
| Comparative example 2 | 3.31 | 1 | 1 | −9.7 | −12.1 |
| Comparative example 3 | 1.88 | 1 | 1 | 6.8 | −18.2 |
| Comparative example 4 | 2.48 | 2 | 3 | 10.2 | −5.5 |
| Comparative example 5 | 0.46 | 0 | 1 | 14.9 | −26.4 |

TABLE 1D

| | Color unevenness and design effect | | Peel force (g/25 mm) | Adhesiveness |
| --- | --- | --- | --- | --- |
| | Solid matte-black (Color unevenness) | Print layer (Color unevenness) (Design effect) | | |
| Example 1 | o | o | 33 | o |
| Example 2 | o | o | 32 | o |
| Example 3 | o | o | 31 | o |
| Example 4 | o | o | 43 | o |
| Example 5 | o | o | 34 | o |
| Comparative example 1 | o | o | 29 | x |
| Comparative example 2 | x | x | 28 | o |
| Comparative example 3 | x | x | 32 | o |
| Comparative example 4 | x | x | 31 | o |
| Comparative example 5 | x | x | 32 | o |

The release films of Example 1 to Example 5 had an average luminous reflectance in the range of 0.5-2.5%, one local minimal value and no local maximal value in the spectral reflectance curve of the release film on the side on which the release layer was formed in the wavelength region of 400-800 nm, and a reflection hue of the release film on the side on which the release layer was formed satisfying both −8≦a*≦8 and −16≦b*≦8 in the L*a*b* color coordinate system so that the resultant release films had only a low level of color unevenness and undesirable coloring. In addition, the release films of Example 1 to Example 5 had a high level of adhesiveness between the release layer and the film substrate because of the existence of the anchor layer.

In addition, the release films of Example 1 to Example 5 and Comparative example 1 to Comparative example 5 which received three-color (white, indigo blue and black) printing on the rear surfaces were visually inspected for foreign materials in a room having a fluorescent light on the ceiling. As a result, foreign materials clearly appeared in the release films of Example 1 to Example 5. On the other hand, in the release films of Comparative example 1 to Comparative example 5, it is necessary to carefully adjust the angles between the release film and the fluorescent light to inspect the film surface since foreign materials did not appear clearly. In other words, the release films of Example 1 to Example 5 had no color unevenness so that the inspections for foreign materials were easily performed.

INDUSTRIAL APPLICABILITY

A release film of the present invention is preferably applied to a medical release film and an industrial release film for a production of a display component such as for an optical display device in which defects caused by foreign materials possibly become fatal because a release film of the present invention has no color unevenness and no undesirable coloring so that an inspection for foreign materials becomes easy. In addition, a release film of the present invention is suitable for a medical release film application due to an excellent adhesiveness between the release layer and the film substrate. Moreover, in the case where a print layer is formed on a release film of the present invention, the release film maintains a high level of display capability and design effect (including aesthetic appearance) because the release film has low reflectance on the release layer surface so that color unevenness and undesirable coloring which may adversely affect the display capability and design effect does not occur.

What is claimed is:

1. A release film comprising:
   a film substrate;
   an anchor layer; and
   a release layer,
   said anchor layer and said release layer being formed in order on said film substrate, average luminous reflectance of said release film on a surface of a side on which said release layer is formed being in the range of 0.5-2.5%, a spectral reflectance curve of said release film on the surface of the side on which said release layer is formed having a local minimal value and no local maximal value in the wavelength of 400-800 nm, a reflection hue of said release film on the side on which the release layer is formed satisfying both −8≦a*≦8 and −16≦b*≦8 in the L*a*b* color coordinate system, a refractive index of said release layer being smaller than a refractive index of said film substrate, the difference in refractive index between said release layer and said substrate being in the range of 0.04-0.27, an optical thickness of said release layer being in the range of 113-225 nm, and an optical thickness of said anchor layer being in the range of 5-45 nm.

2. The release film according to claim 1, wherein a print layer is formed on an opposite surface of said release film from the side on which said release layer is formed.

3. A stacked body comprising:
   the release film according to claim 1; and
   a base substance, a surface of said base substance contacting with a surface of said release layer of said release film.

4. A stacked body comprising:
   the release film according to claim 2; and
   a base substance, a surface of said base substance contacting with a surface of said release layer of said release film.

5. A stacked body comprising:
   a base substance; and
   a release film which includes a film substrate; an anchor layer; and a release layer;
   said anchor layer and said release layer being formed in order on said film substrate, average luminous reflectance of said release film on a surface of a side on which said release layer is formed being in the range of 0.5-2.5%, a spectral reflectance curve of said release film on the surface of the side on which said release layer is formed having a local minimal value and no local maximal value in the wavelength of 400-800 nm, a reflection hue of said release film on the side on which the release layer is formed satisfying both $-8 \leqq a^* \leqq 8$ and $-16 \leqq b^* \leqq 8$ in the $L^*a^*b^*$ color coordinate system, a print layer being formed on an opposite surface of said release film from the side on which said release layer is formed, and a surface of said base substance contacting with a surface of said release layer of said release film.

* * * * *